United States Patent [19]

Maruyama et al.

[11] Patent Number: 4,965,463
[45] Date of Patent: Oct. 23, 1990

[54] FLAT FREQUENCY, CONSTANT VOLTAGE POWER SOURCE DEVICE

[75] Inventors: Tsutomu Maruyama; Koichi Kobayashi, both of Tokyo, Japan

[73] Assignee: Sanyo Denki Co., Ltd., Japan

[21] Appl. No.: 366,288

[22] Filed: Jun. 13, 1989

Related U.S. Application Data

[63] Continuation of Ser. No. 204,241, Jun. 9, 1988, abandoned.

[30] Foreign Application Priority Data

Jun. 15, 1987 [JP] Japan .................................. 62-148753
Jan. 27, 1988 [JP] Japan .................................. 63-16314

[51] Int. Cl.$^5$ ............................................. H02P 9/00
[52] U.S. Cl. ...................................... 307/87; 318/102; 322/16; 307/84
[58] Field of Search ............. 318/41, 42, 44, 100–103, 318/539; 307/84, 87; 322/13, 16, 20, 25, 29, 32, 39

[56] References Cited

U.S. PATENT DOCUMENTS

| | | | |
|---|---|---|---|
| 2,320,875 | 1/1943 | Liwschitz | 307/87 |
| 3,753,002 | 8/1973 | Jacobson et al. | 307/87 |
| 4,575,671 | 3/1986 | Lee et al. | 322/16 |
| 4,628,246 | 12/1986 | Dronen | 307/87 |

Primary Examiner—David Smith, Jr.

[57] ABSTRACT

A flat frequency, constant voltage power source device is provided for parallel operation of a plurality of electric generators. The generators include exciting windings of induction motors integral with the generators for connecting and disconnecting outputs of the generators. A starting sequence of the electric generators is based on a start signal provided externally and start preparation completion signals indicating completion of start preparation routines. The induction motors of the generators are thereby varied in frequency so that the generators can be synchronized in phase for their effective parallel operation.

2 Claims, 4 Drawing Sheets

FLAT FREQUENCY, CONSTANT VOLTAGE POWER SOURCE DEVICE

This application is a continuation of application Ser. No. 07/204,241 filed June 9, 1988.

TECHNICAL BACKGROUND OF THE INVENTION

This invention relates to a flat frequency, constant voltage power source device including a plurality of A.C. electric generators, and to a method for a smooth parallel operation of such generators in the device.

DISCLOSURE OF PRIOR ART

Figure 9:
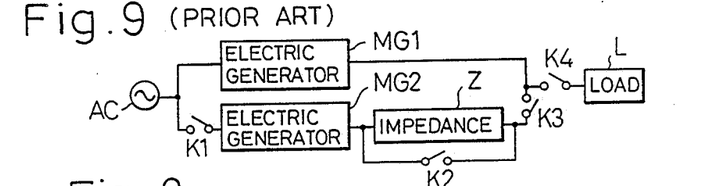
FIG. 9 is a circuit diagram showing a known power source device.

Known flat frequency and constant voltage power source device of the kind referred to comprises, as shown, for example, in FIG. 9, a plurality of electric generators MG1, MG2 in each of which an induction motor and a generator are made integral, and these electric generators MG1, MG2 are connected to a commercial alternating current source AC and to a load L, while a switch K1 is inserted at front stage of the electric generator MG2, a parallel circuit of an impedance Z and a switch K2 is inserted at rear stage of the generator MG2, another switch K3 is inserted at rear stage of the parallel circuit and still another switch K4 is inserted between a junction point of the switch K3 with the generator MG1 and the load L.

When in this arrangement only the electric generator MG1 is supplying a power to the load but the other generator MG2 is to be put into parallel operation, then the switch K1 is initially closed to start the other generator MG2. When its output voltage has reached a predetermined frequency and voltage level, next, the switch K3 is closed to place the other generator MG2 in the parallel operation with the generator MG1 through the impedance Z, upon which an electric current corresponding to a phase difference between the both electric generators MG1 and MG2 is caused to flow through the impedance Z. Since the both electric generators MG1 and MG2 are different from each other in the extent of slip, their output frequencies are caused to be different from each other, whereby the phase difference is made to vary periodically. The current through the impedance Z is monitored in this state, and the switch K4 is closed at a time point when the current has become smaller, that is, when the phase difference is close to zero, to have the placing into the parallel operation of the generator MG2 completed. As the switch K4 is closed, there is caused a synchronizing power acted between the electric generators MG1 and MG2, and their parallel operation can be thereby maintained.

In this example of the known device, however, there have been left such problems unsolved that the impedance Z employing a reactor or resistor has to be provided along with the switch K2, their mounting space must be secured for dealing with thereby generated heat, and so on.

FIELD OF ART

A primary object of the present invention is, therefore, to provide a flat frequency, constant voltage power source device which has solved the foregoing problems and does not require any impedance of a large current capacity, switch and the like which have been heretofore required only upon achieving the parallel generator operation, and thus involving no heat generation or the like problem.

Another object of the present invention is to provide a flat frequency, constant voltage power source device which can automatically decide starting sequence of a plurality of electric generators in the device only with a start signal given once, and automatically place these electric generators into the parallel operation.

Still another object of the present invention is to provide a flat frequency, constant voltage power source device which requires no specialized operator for starting the electric generators in the device.

Yet another object of the present invention is to provide a flat frequency, constant voltage power source device which allows a remote operation for starting the electric generators in the device.

A further object of the present invention is to provide a method for achieving the parallel operation of the plurality of electric generators of the flat frequency, constant voltage power source device, with output voltage phase easily made coincident throughout the generators.

According to the present invention, the foregoing objects can be achieved by a flat frequency, constant voltage power source device in which exciting windings in every phase of induction motors forming the electric generators to be placed into parallel operation are connected and disconnected by means of switches. Output frequencies of the generators vary. A starting sequence of the generators is based on an externally provided start signal and start preparation completion signals indicating completion of start preparation routines. The generators are placed into parallel operation upon phase synchronization.

Any other objects and advantages of the present invention shall be made clear in the following description of the invention detailed with reference to preferred embodiments shown in accompanying drawings.

While the present invention shall now be explained with reference to the preferred embodiments shown in the accompanying drawings, it should be appreciated that the intention is not to limit the present invention only to such embodiments shown but rather to include all alterations, modifications and equivalent arrangements possible within the scope of appended claims.

DISCLOSURE OF PREFERRED EMBODIMENTS

Figure 1:
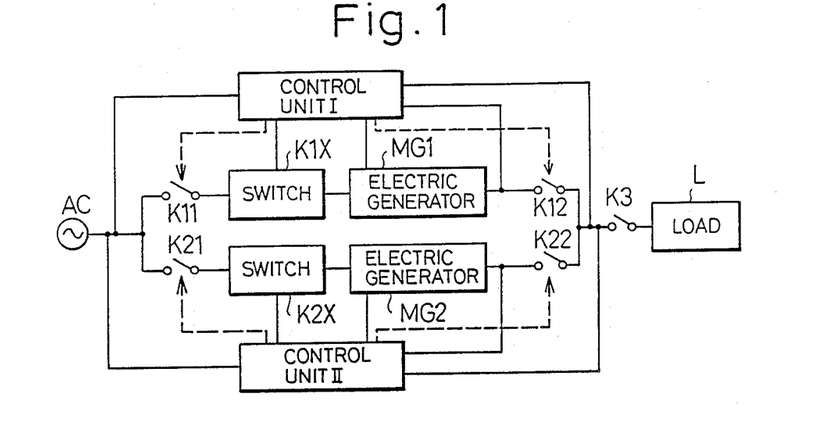
FIG. 1 is a circuit diagram of a flat frequency, constant voltage power source device in an embodiment according to the present invention.

In FIG. 1, there is shown an embodiment of the flat frequency, constant voltage power source device according to the present invention, which comprises a first circuit including in sequence a first switch K11 connected to a commercial alternating current source AC, a first group K1X of switches for changing over respective phase windings of induction motor in an electric generator MG1 from, for example, a star connection to a delta connection, or from the delta connection to the star connection, the first electric generator MG1, and a second switch K12; and a second circuit including in sequence a third switch K21 also connected to the source AC, a second switch group K2X achieving the same function as the first switch group K1X, second electric generator MG2, and a fourth switch K22; and output sides of the first and second circuits are connected commonly through a fifth switch K3 to a load L. Further, a first control unit I is connected to the first circuit for controlling, with an input received from the commercial source AC, the first switch K11, first switch group K1X, first electric generator MG1 and second switch K12, and a second control unit II is connected to the second circuit similarly for controlling the third switch K21, second switch group K2X, second electric generator MG2 and fourth switch K22.

Figure 2:
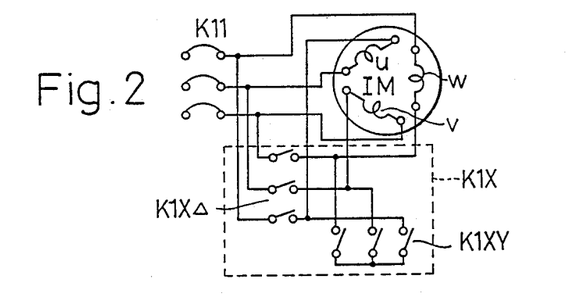
FIG. 2 is a diagram for explaining connecting state of exciting windings of induction motors in the electric generators in the device of FIG. 1.

When, in this flat frequency, constant voltage power source device, a voltage is applied from the source AC to the induction motor, initially, a star connection switch K1XY in the first switch group K1X as shown in FIG. 2 and designed for restraining the voltage applied to the respective phase windings to be small and thus an input current to be small. Thereafter, the star connection switch K1XY is turned OFF when motor revolution number is increased and the input current is decreased, and a delta connection switch K1XΔ is now turned ON, and a power feed to the load is carried out with this delta connection. Preferably, the induction motor IM is provided with windings u1, u2; v1, v2; and w1, w2 for the respective phases, as in FIGS. 3A and 3B, so that a series connection will be employed upon the initial voltage application whereas, when the motor revolution number is properly increased, the connection may be changed over to a parallel connection for the power feeding to the load.

In either event, the input current value is varied as the connection of the exciting windings in the indication motor is changed over, accompanying which the slip of rotors of the induction motor changes. When an AC generator is directly coupled to the induction motor, therefore, generator output frequency varies. Utilizing this output frequency change of the AC generator upon the connection change-over, the phase coincidence upon placing the electric generators into the parallel operation is carried out.

The operation of the flat frequency, constant voltage power source device in the present embodiment shall be set forth next.

In the case of no-load operation of the electric generator

It is here assumed that the first electric generator MG1 is in no-load operation with the first and third switches K11 and K12 closed while the fifth switch K3 is opened. The exciting windings of the induction motor are in the delta connection, with the delta connection switch K1X turned ON, and the rotor slip is in the minimum state, so that the output of the generator MG1 will be of rated frequency and voltage. On the other hand, it is assumed that the second electric generator MG2 is in the same state as the first electric generator MG1, except that the fourth switch K22 on the output side is opened, and the second generator output is also of the rated frequency and voltage. Under this condition, the second electric generator MG2 may be placed into the parallel operation, by closing the fourth switch K22.

Since the both electric generators MG1 and MG2 in the above are in the delta connection of the exciting windings and are in the no-load state, their output frequency is identical to each other. Provided that any phase difference is present in the output voltages of the both electric generators MG1 and MG2, they cannot be placed into the parallel operation. If they are forcibly placed into the parallel operation, a large cross flow takes place between the both electric generators MG1 and MG2 and an overload state is reached. In the present embodiment, therefore, the phase difference present in the output voltages of the both electric generators MG1 and MG2 is made to be varied in such manner as follows.

First, the control unit II instructs the second switch group K2X to operate so as to turn ON the star connection switch K1XY for changing over the exciting windings u, v and w of the induction motor in the second electric generator MG2 from the delta connection to the star connection, whereby the input current is caused to be decreased and the rotor slip is increased. Accordingly, the output frequency of the second electric generator MG2 is lowered, and the phase difference in the output voltage between the both electric generators MG1 and MG2 is varied, upon which a difference in the output voltage between the both generators MG1 and MG2 appears across the fourth switch K22. This differential voltage corresponds to an output frequency difference between the both generators MG1 and MG2 and periodically varies. Here, the timing upon which the differential voltage becomes zero is the time when the phase difference in the output voltage between the both generators MG1 and MG2 becomes zero, the fourth switch K22 is therefore closed in synchronism with this timing to carry out the parallel operation, and the second switch group K2X is operated to change over the exciting windings to the delta connection. Since in this case the phase difference in the output voltage between the both generators MG1 and MG2 is made zero, the cross flow is not made to be larger and the generators are stably placed into the parallel operating state. The fifth switch K3 is closed at this stable parallel operating state, and the power supply to the load is carried out.

In the case when one of the electric generators in on-load operation state and the other generator is placed into the parallel operation In an event where the second electric generator MG2 is placed into the parallel operation with the first generator MG1 which is carrying out the power feed to the load with the fifth switch K3 closed, the slip of the induction motor in the second generator MG2 is the minimum since this generator is in no-load. Provided that the load to which the power is fed by the first generator MG1 is large, the slip of this generator MG1 is made larger, and the differential voltage appearing across the fourth switch K22 varies with a quick beat. Accordingly, the placing of the second electric generator MG2 into the parallel operation at this time can be completed by turning ON the fourth switch K22 at the timing when the phase difference becomes zero, without changing over the winding connection for the generator MG2.

When on the other hand the load is small, the slip is substantially equal between the both generators MG1 and MG2, varying cycle of the phase difference in the output voltages becomes longer, and a required time until completion of the parallel operation becomes longer. In this event, therefore, the parallel operation is to be achieved by once changing the exciting windings of the second electric generator MG2 over to the star connection, in the same manner as in the case of no-load parallel operation.

Figure 4:
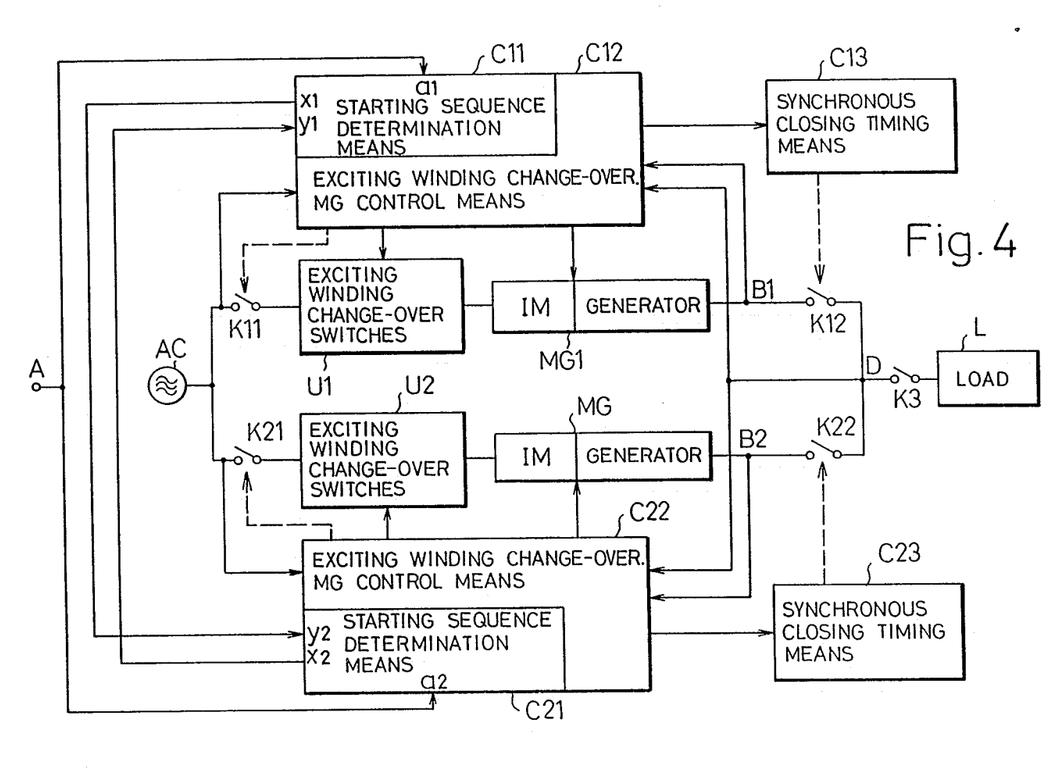
FIG. 4 is a circuit diagram of the device in another embodiment of the present invention.
Figures 5, 6:
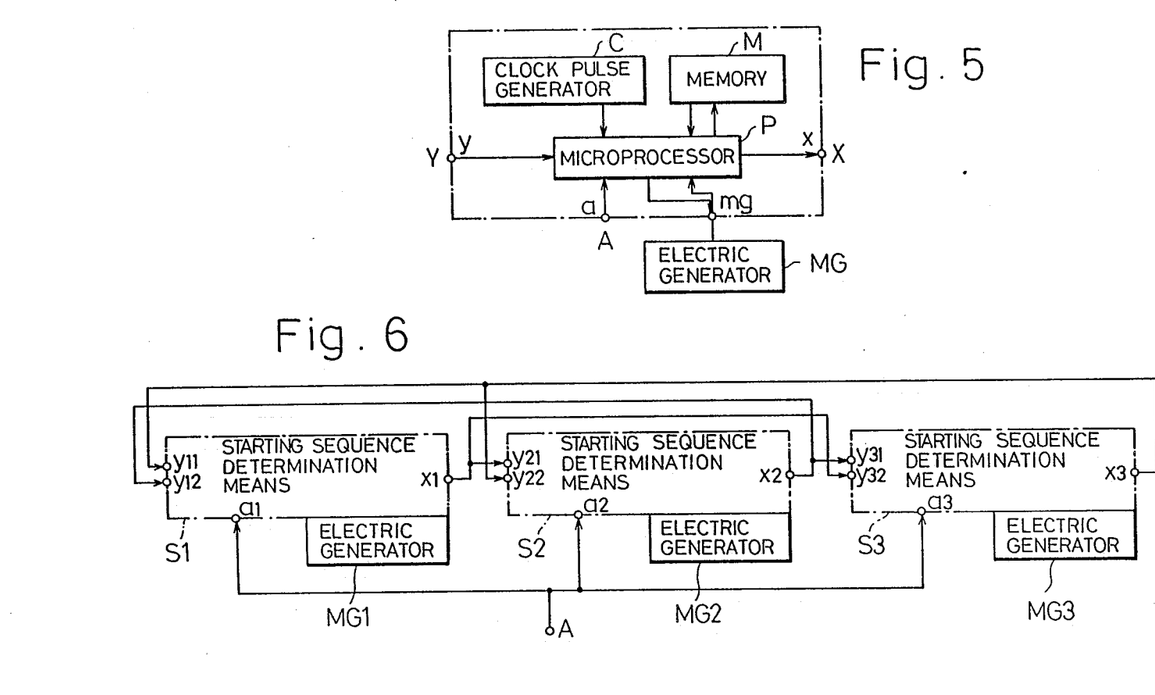
FIG. 5 is a block diagram of a starting sequence deciding means in the device of FIG. 4.
FIG. 6 is a circuit diagram showing in details a practical example of the starting sequence deciding means adapted to be used for three of the electric generators.

Referring to FIG. 4, there is shown another embodiment of the device according to the present invention for the parallel operation of a plurality of the electric generators, in which the device comprises first and second starting sequence determination means C11 and C21, such as shown in FIG. 5, and these determination means are provided respectively for each of the first and second electric generators MG1 and MG2. When these generators MG1 and MG2 are in a state of being ready to be started and a start signal A is externally provided, the starting sequence determination means C11 and C21 receive this signal A and proceed with required processing for the starting sequence determination.

Since the two starting sequence determination means C11 and C21 involve, though generally very small, a difference in oscillation frequency of clock pulse generators, there arises a difference in processing speed. When a plurality of processings have to be carried out, further, there arises a difference in required time until the starting sequence determination is initiated to be processed, so that a difference will be caused to arise in required time until a decision is made whether a preparation for the starting is completed, even when the start signal A is simultaneously received.

Now, it is assumed here that the first starting sequence determination means C11 has completed the processing earlier and has provided at a terminal x1 a signal X denoting the start preparation completed. When the second starting sequence determination means C21 receives this signal X from the means C11 at a terminal y2, the second means C21 acts to interrupt the processing and not to provide the signal X at a terminal x2. Here, the first starting sequence determination means C11 senses that the signal X has not reached a terminal y1 from the second means C21, and determines that its starting sequence is the top, whereby an information of the start initiation is provided from the first means C11 to a means C12 for changing over the exciting winding connection in the corresponding electric generator MG1 and for controlling this generator (the means C12 shall be hereinafter referred to as "first MG control means"). The first MG control means C12 provides initially a signal to a first switch K11 to close the same, and then causes a first switch group U1 to be turned for the star connection (with the switch K1XY in FIG. 2 turned on), whereby the electric generator MG1 is made to start rotating. As the generator MG1 elevates the revolution number and the exciting current decreases, the switch group U1 is actuated to change over the connection to the delta connection (with the switches K1XY and K1XΔ opened and closed, respectively, in FIG. 2). This input condition for the electric generator MG1 at this time is regarded as a steady operation state. When the voltage and frequency at output point B1 of the generator MG1 are detected to be in the steady state, a synchronous closing timing means C13 connected to the MG control means C12 determines, in view of that the voltage at a device output point D is zero, that the first electric generator MG1 is the one to be first started and causes a second switch K12 to be closed.

As the first electric generator MG1 is started, the provision of the signal X is ceased. When this cease of the signal X from the first starting sequence determination means C11 is detected at the terminal y2, the second starting sequence determination means C21 causes the interrupted processing for the starting sequence determination to be carried out again. When the second means C21 completes the preparation for the starting, the signal X is transmitted from the terminal x2. Here, the first starting sequence determination means C11 which has already started does not provide the signal X out of the terminal x1, there exists no signal X at the terminal y2 of the second starting sequence determination means C21. Accordingly, the second means C21 determines that the means itself to be of the top starting sequence and provides to its own exciting winding change-over and MG control means C22 (which shall be hereinafter referred to as "second MG control means") an information of initiating the starting. The second MG control means C22 causes a third switch K21 closed and actuates a second switch group U2 to have the winding connection changed over to the star connection, so as to start the second electric generator MG2 while restraining inrush current. As the generator revolution number rises to be closer to a rated number, the second switch group U2 is actuated to change over the winding connection to the delta connection. When a second synchronous closing timing means C23 detects that the voltage and frequency are established at an output point B2 of the second generator MG2, the second timing means C23 shifts to an operation for rendering the output of the second generator MG2 to be synchronized with that of the first generator MG1.

First, the second timing means C23 reads the frequencies at the both output points B2 and D and, in an event where the frequencies are close to each other so as to render the beat cycle of voltage difference between the both points B2 and D to be longer, performs forcibly the synchronization. The second MG control means C22 instructs the second switch group U2, so as to change over the exciting winding connection in the induction motor of the second generator MG2 from the delta connection to the star connection (with the switch corresponding to K1XY in FIG. 2 closed), whereby the input current is decreased while the slip increases, due to which the output frequency is lowered and the phase difference in the output voltages of the both generators MG1 and MG2 varies at a short cycle. A differential voltage appearing across a fourth switch K22 which is in open state at this time, that is, between the voltages at the both output points B2 and D corresponds to the output frequency difference between the both electric generators and varies periodically.

The second synchronous closing timing means C23 operates to obtain the beat cycle of the differential voltage, with the frequencies of the voltages at the both output points B2 and D employed as the reference. Next, the time when one half of the beat cycle has elapsed after the time when the differential voltage has become constant is set to be the timing at which the closing of the switch K22 is completed, and instructions for closing the switch K22 is generated earlier than this set timing by a delay period of the switch K22, so that the switch K22 can be closed at the time when the differential voltage is the minimum and the parallel operation of the both electric generators MG1 and MG2 can be carried out in a state in which any transient fluctuation is the minimum. Thereafter, the switch group U2 is actuated to restore the delta connection for the second generator MG2 to shift it to be in a state of steady parallel operation, and then the fifth switch K3 is closed to start the power feeding to the load L.

In achieving the parallel operation by starting the second generator MG2 in a state where the first generator MG1 is already feeding the power to the load, the first generator MG1 is in a state of a larger slip than in the non-load operation so that the just started non-load second generator MG2 is of a higher frequency in the output voltage, and, accordingly, it is possible to achieve the phase coincidence at a short cycle without the connection change-over at the switch group U2 for the second generator MG2.

In the embodiment of FIG. 4, the starting sequence determination means, MG control means and synchronous closing timing means are provided respectively with respect to each of the electric generators. While various inputs and outputs are provided through many signal lines between the foregoing respective means and the electric generators, it is made possible to easily execute any inspection and repair upon any trouble by providing the respective means and signal lines with respect to each of the electric generators, or even to exchange the entire means in trouble with a reserve means with respect to the generator, and required waiting time for the repair can be shortened. In the sense of functioning, on the other hand, part or all of the respective means may be employed in common for the respective electric generators, so that a remarkable economical effect can be expected.

The arrangement and operation of the present embodiment shall be further detailed with reference to FIG. 5, in which the starting sequence determination means C11 or C21 of FIG. 4 is shown in a block diagram, along with associated one of the electric generators MG. The starting sequence determination means C11 or C21 comprises a microprocessor P to which a clock pulse generator C and a memory M are connected, and collects data denoting the state of the generator MG through the input terminal a for the start signal A and a terminal mg at which the means is connected to the generator MG, and the starting instructions for the generator MG are also received. The signal X from the microprocessor P is transmitted out of the terminal x, and the signal Y from the microprocessor in the other determination means is received at the input terminal y.

The arrangement for controlling the electric generator MG is made to keep functioning even in a state where the generator has ceased its rotation. That is, the starting sequence determination means as in FIG. 4 is also kept in operating state, and the microprocessor P is thus carrying out the signal processing in synchronism with the clock signal from the clock pulse generator C.

In the present instance, such information for determining if the electric generator MG can be started or not as those denoting whether or not the generator MG is receiving the input, whether or not the voltage and frequency of the generator are normal and so on, are collected through the terminal mg and are stored in the memory M. Upon receipt of the externally provided start signal A, the microprocessor P starts required processing for the start sequence determination. When it is determined in view of the contents in the memory M that the start preparation of the generator MG is completed, the signal X denoting the completion of the start preparation is provided out of the terminal x. When it is detected that the signal Y has not reached the terminal y from the other electric generator, the start signal A is provided to the generator MG. Upon starting of the generator MG, the transmission of the signal X is ceased. When the signal Y reaches while the signal X is being transmitted and during a detecting period in which the presence or absence of the signal Y from the other electric generator is detected, the microprocessor P stops the signal X transmission, and starts required processing for a new starting sequence determination. When the signal Y is received prior to the transmission of the signal X, on the other hand, the microprocessor P interrupts the processing of the starting sequence determination, but starts again the processing when the absence of the signal Y is detected.

While the flat frequency, constant voltage power source device according to the present invention has been described in the above with reference to the parallel operation of the two electric generators, the device is capable of performing the parallel operation of more than three electric generators, if required. Referring to FIG. 6, there is shown an arrangement of the starting sequence determination means in the power source device for the parallel operation of three electric generators. In the drawing, the three starting sequence determination means S1 to S3 are mutually connected at their input terminals a1, a2 and a3 for receiving the start signal A, and their output terminals x1, x2 and x3 are respectively connected to two further input terminals y21, y32; y31, y12; and y11, y22 of other two determination means.

It should be here assumed that associated three electric generators MG1, MG2 and MG3 are all prepared to be started and, upon receipt of the start signal A externally provided, the starting sequence determination means S1-S3 start the required processing for the starting sequence determination. Here, the starting sequence determination means S1 should be assumed to have provided at the terminal x1 the signal denoting the completion of the start preparation for the earliest turn among the three. Then, the remaining starting sequence determination means S2 and S3 which have been in the processing operation interrupt their operation and come into waiting state. The determination means S1 detects that the signal Y has not reached the input terminals y11 and y12, and determines that the means itself is of the top starting sequence, whereupon the start initiating signal is provided from the determination means S1 to its associated electric generator MG1.

As the generator MG1 starts operating, the determination means S1 stops the signal X being transmitted out of the terminal x1. When the remaining two starting sequence determination means S2 and S3 detect the absence of the signal from the means S1, they execute again the processing operation for the starting sequence determination. Provided that, for example, the means S2 has completed the start preparation earlier than the means S3, the means S2 provides a signal from its terminal x2 to the input terminal y31 of the means S3, which signal causes the processing operation of the means S3 interrupted. The means S2 detects the absence of any signal at its input terminals y21 and y22, and the start initiating signal is provided from the means S2 to its associated electric generator MG2 to start it. The thus started generator MG2 satisfies conditions for the parallel operation with the electric generator MG1 which has been started earlier for the power feeding to the load, and is placed into the parallel operation therewith, whereby the two electric generators MG1 and MG2 are in the parallel operation for the power feeding.

As the electric generator MG2 starts operating, the starting sequence determination means S2 stops transmitting any signal, responsive to which the last starting sequence determination means S3 executes again the interrupted processing for the start sequence determination. As the start preparation is thereby completed at the means S3, it provides the start signal out of the terminal x3 but, since the generators MG1 and MG2 have already been started, the absence of any input signal at the terminals y31 and y32 is detected to cause the means S3 to determine that the third electric generator MG3 can be started, and this generator MG3 is started.

As the third electric generator MG3 is thus started and placed into the parallel operation with the first and second generators MG1 and MG2 which have already been operated, all of the three electric generators are in the parallel operating state, and thereby the starting of the flat frequency, constant voltage power source device comprising the three electric generators is completed.

When either one of the starting sequence determination means S1–S3 is providing the signal denoting itself the start preparation completed and simultaneously has received signals from other means, the particular determination means is reset to execute a new processing for the starting sequence determination. In this processing operation, one of the three starting sequence determination means arises to be capable of determining that the particular means can be started, prior to a reception of any signal from other means, and this determination means is regarded to be of the top starting sequence so that the same will be started. This procedure is repeated, and the three electric generators can be started sequentially and placed into the parallel operation state smoothly.

When either one of the three electric generators is out of order so as not to be operable, its own start preparation completed signal accompanying the completion of the start preparation of this particular generator or the stop of the starting sequence determination means is not provided and, accordingly, the remaining two normal generators are started in the sequence determined through the predetermined procedure and are placed into the parallel operation.

It should be readily appreciated by any skilled in the art that the starting sequence of even more than four of the electric generators to be placed into the parallel operation can be determined by the device according to the present invention as has been described.

While in the arrangement of FIG. 5 the microprocessor has been referred to as being employed only as the starting sequence determination means, further, the same may be equally effectively employed as a control means for the electric generator in such manner as any other data processing than the starting sequence determination, sequence function upon starting the generators, evaluation of sequence operation, operational administration and so on.

Next, an arrangement for forcibly varying the phase of the output voltages of the electric generators shall be described in the followings. In the present instance, the induction motor IM carries out the connection change-over of the exciting windings in order to prevent the input current from becoming larger upon the starting.

In applying the input source voltage to the induction motor IM, here, the switch K1XY is closed to achieve the star connection so that the voltage applied to the respective phase windings will be initially small and accordingly the input current will be restrained to be small. As the revolution number increases and the input current decreases, the switch K1XY is opened and the other switch K1XΔ is closed to change over the winding connection to the delta connection.

Figure 3:
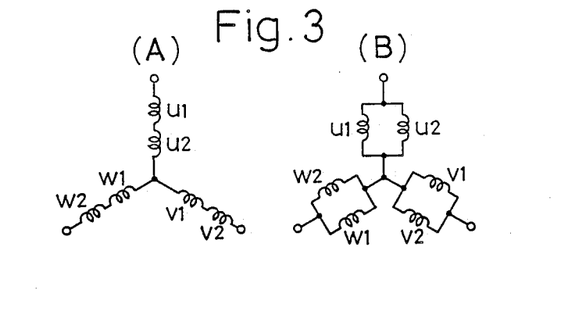
FIGS. 3A and 3B are explanatory views for connection modes of the exciting windings in the device of FIG. 1.

As has been briefly referred to, on the other hand, the induction motor IM is formed so that, as in FIG. 3, two of the windings are provided for the respective phases, and these windings are so arranged that the initial input voltage application will be carried out with such series connection as in FIG. 3A while, as the revolution number increases, the power feeding to the load will be carried out with the winding connection changed over to such parallel connection as in FIG. 3B. In either case, the input current value changes when the connection of the exciting windings in the induction motor IM is changed over, responsive to which the slip state also varies to cause the output frequency of the electric generator integral with the motor IM to vary. Utilizing this variation in the output frequency of the generator due to the change-over of the winding connection, therefore, it is made possible to achieve the phase coincidence upon placing the respective electric generators.

Figure 7:
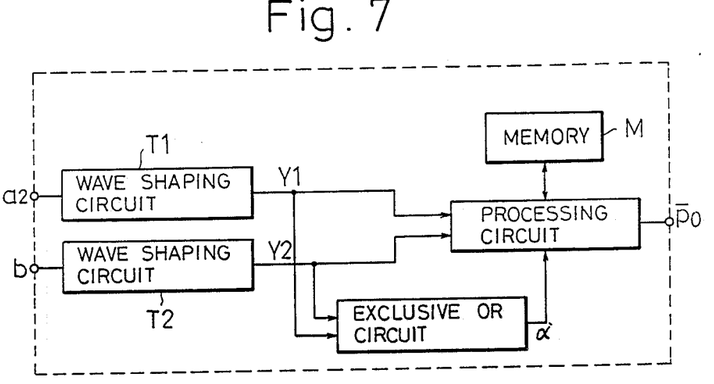
FIG. 7 is a block diagram of a synchronous timing predicting means in the device of FIG. 4.
Figure 8:
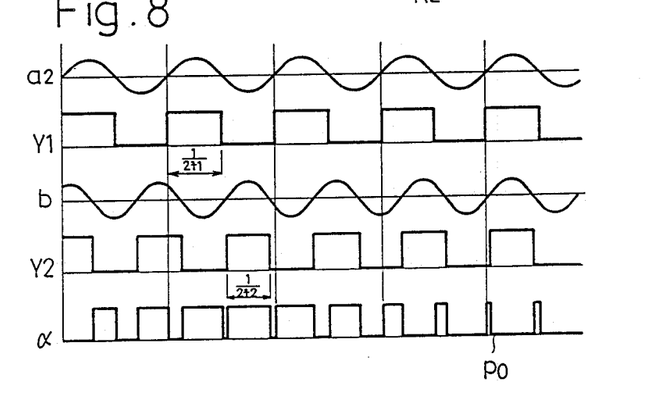
FIG. 8 is a diagram showing waveforms at respective parts in the predicting means of FIG. 7.

Referring now to FIGS. 7 to 8, there is shown in a block diagram of FIG. 7 a synchronous timing predicting means, which is formed to obtain a product of two trigonometric functions having frequencies corresponding to such sum and difference as shown by following formula of different frequencies of two AC voltages:

$$E \sin 2\pi f_1 t - E \sin 2\pi f_2 t$$
$$= 2E \sin 2\pi\{(f_1+f_2)/2\}\cdot t \cdot \cos 2\pi\{(f_1-f_2)/2\}\cdot t$$

Here, the difference between the two voltages causes the beat to take place, and its half cycle is $1/|f_1 - f_2|\Delta$. Time point Po when the beat voltage becomes zero is the time point at which the phase difference between the two voltages becomes the minimum.

If the two electric generators would be placed into the parallel operation at the time point Po by closing such electromagnetic switches of output circuit as K12 and K22 in FIG. 4, the minimum phase difference between the two voltages would render any transient fluctuation in the voltage fed to the load to be the minimum.

In practice, on the other hand, the electromagnetic switch also involves a time lag in its actuation. That is, the electromagnetic switch does not complete its switching operation generally for several 10 msec elapsed after receipt of actuating instructions, due to a lag caused in required driving circuit or mechanically actuating delay. Therefore, the signal of instructions for closing the electromagnetic switches is transmitted at a time point at which a time corresponding to a balance of a subtraction of the delay time $\Delta T$ of the electromagnetic switch from the half beat cycle $1/|f_1 - f_2|$ has elapsed after the time point Po as the base point, whereby the closing of the electromagnetic switch is completed at the time point Po when a further delay time $\Delta T$ has elapsed.

The synchronous timing predicting means comprises two wave shaping circuits T1 and T2, which convert inputs a2 and b of sine-wave AC voltage into DC voltage signals Y1 and Y2 of square waves respectively having a width of half wave of the sine-wave. In the predicting means, further, a processing circuit receives the converted signal Y1 and operates to obtain a half cycle $\frac{1}{2}f_1$ of the input voltage a2 from the pulse width of the signal, and this operation result is stored in a memory M. Similarly, a half cycle $\frac{1}{2}f_2$ of the input voltage b is obtained from the converted signal Y2 and is stored in the memory M. From these half cycles $\frac{1}{2}f_1$ and $\frac{1}{2}f_2$, the half beat cycle $1/|f_1 - f_2|$ is operated, and its operation result is also stored in the memory M. Further, an exclusive OR circuit takes an exclusive "or" of the signals Y1 and Y2 and provides a signal $\alpha$ which varies in pulse width in such that the pulse width of the signal ° is smallest when the phase difference between the input voltage signals a2 and b is the minimum.

In addition, the processing circuit measures the pulse width of the signal $\alpha$ and determines that a time point when the smallest width pulse is received is the time point Po upon which the input voltage signals a2 and b are mutually in-phase. Then, the processing circuit provides a signal at the time point Po at which a time $(1/|f_1-f_2|)-\Delta T$ has elapsed from the time point Po, on the basis of the delay time $\Delta T$ of the electromagnetic switch and the half beat cycle $1/|F_1-f_2|$ stored in the memory M.

What we claim as our invention is:

1. A flat frequency, constant voltage power source device for use in parallel operation in a plurality of electric generators, the device comprising:
   a plurality of circuits, each circuit respectively corresponding to one of said plurality of electric generators and including:
   (i) an electric generator including a generator and an induction motor directly coupled to said generator and having an output side and exciting windings provided for three phases capable of being connected in first and second configurations,
   (ii) a switch group connected to the exciting windings of said electric generator for connecting said exciting windings of said induction motor in the first and second configurations,
   (iii) a first switch disposed between a commercial power source and said electric generator for connecting said electric generator to the power source,
   (iv) a second switch disposed between said electric generator and a load for connecting the output side of said electric generator to the load, and
   (v) means for determining starting sequence of the plurality of electric generators based on an externally provided start signal and start preparation completion signals transmitted between said means for determining starting sequence; and
   control means connected to said first switch, said switch group, and said second switch of each circuit for controlling each of said circuits, said control means including:
   means connected to outputs of each of said circuits for detecting any phase difference between an output voltage of said electric generator of one of said circuits which has already been connected through said second switch to said one circuit to the load and output voltages of said electric generators of remaining circuits to be connected to the load in parallel with said electric generator of said one circuit, and
   means for operating said switch group in accordance with the starting sequence determined by said starting sequence determination means and responsive to a detected phase difference to change over said winding connection in said electric generators of said remaining circuits from the first configuration to the second configuration in accordance with the phase difference detected for each electric generator of each remaining circuit to vary rotor slips of said electric generators of said remaining circuits to vary the output frequency of each output voltage, thereby varying the phase difference, and operating said switch group to change over said winding connection from the second configuration to the first configuration and operating said second switch of each remaining circuit to connect said electric generator of each remaining circuit to the load at a time when the phase difference is made zero
   wherein each of said means for determining starting sequence of said circuits includes:
   (a) means for receiving a start signal,
   (b) means for executing a start preparation routine,
   (c) means operative on completion of the start preparation routine for transmitting a start preparation completion signal to starting sequence determining means of other of the plurality of circuits, and
   (d) means for restarting the start preparation routine upon receipt of a start preparation completion signal from a starting sequence determination means of another of the plurality of circuits,
   wherein said means for operating changes over each of said electric generators of said circuits when each of said means for determining starting sequence of each of said circuits completes the start preparation routine.

2. A flat frequency, constant voltage power source device for use in parallel operation in a plurality of electric generators, the device comprising:
   a plurality of circuits, each circuit respectively corresponding to one of said plurality of electric generators and including:
   (i) an electric generator including a generator and an induction motor directly coupled to said generator and having an output side and exciting windings provided for three phases capable of being connected in first and second configurations,
   (ii) a switch group connected to the exciting windings of said electric generator for connecting said exciting windings of said induction motor in the first and second configurations,
   (iii) a first switch disposed between a commercial power source and said electric generator for connecting said electric generator to the power source,
   (iv) a second switch disposed between said electric generator and a load for connecting the output side of said electric generator to the load, and (v) means for determining starting sequence of the plurality of electric generators based on an externally provided start signal and start preparation completion signals transmitted between said means for determining starting sequence; and control means connected to said first switch, said switch group, and said second switch of each circuit for controlling each of said circuits, said control means including:

means connected to outputs of each of said circuits for detecting any phase difference between an output voltage of said electric generator of one of said circuits which has already been connected through said second switch to said one circuit to the load and output voltages of said electric generators of remaining circuits to be connected to the load in parallel with said electric generator of said one circuit, and means for operating said switch group in accordance with the starting sequence determined by said starting sequence determination means and responsive to a detected phase difference to change over said winding connection in said electric generators of said remaining circuits from the first configuration to the second configuration in accordance with the phase difference detected for each electric generator of each remaining circuit to vary rotor slips of said electric generators of said remaining circuits to vary the output frequency of each output voltage, thereby varying the phase difference, and operating said switch group to change over said winding connection from the second configuration to the first configuration and operating said second switch of each remaining circuit to connect said electric generator of each remaining circuit to the load at a time when the phase difference is made zero, wherein each of said means for determining starting sequence of said circuits includes:

(a) a clock pulse generator, said clock pulse generators of different ones of said means for determining starting sequence of said circuits varying slightly in clock pulse generator oscillation frequency, (b) an X output terminal for transmitting the start preparation completion signal, (c) a Y input terminal for receiving the start preparation completion signal, and (d) an output operatively connected to said first switch for closing said first switch responsive to completion of the start preparation routine.

* * * * *